(12) United States Patent
Hassell et al.

(10) Patent No.: US 7,310,671 B1
(45) Date of Patent: Dec. 18, 2007

(54) SYSTEM AND METHOD FOR A TROUBLE SHOOTING PORTAL TO ALLOW TEMPORARY MANAGEMENT ACCESS TO A COMMUNICATION DEVICE

(75) Inventors: Suzanne P. Hassell, Clearwater, FL (US); Jeff Davis, Indian Rocks Beach, FL (US); Charles J. Mele, Neshanic Station, NJ (US); Eric K. Vallone, Fair Haven, NJ (US); Michael J. Cripps, Lincroft, NJ (US); Edward W. Landis, Holmdel, NJ (US); Warren M. Bartlett, Palm Harbor, FL (US); Roopali S. Paranjpe, Bridgewater, NJ (US)

(73) Assignee: Paradyne Corporation, Largo, FL (US)

( * ) Notice: Subject to any disclaimer, the term of this patent is extended or adjusted under 35 U.S.C. 154(b) by 1057 days.

(21) Appl. No.: 09/650,867

(22) Filed: Aug. 30, 2000

Related U.S. Application Data

(60) Provisional application No. 60/181,633, filed on Mar. 1, 2000, provisional application No. 60/186,136, filed on Feb. 10, 2000.

(51) Int. Cl.
*G06F 15/173* (2006.01)

(52) U.S. Cl. .............. 709/225; 709/224; 709/250

(58) Field of Classification Search .......... 713/200; 709/223, 217, 218, 224, 227, 250, 201; 370/250, 370/251, 392, 248, 354, 422, 401, 252, 254; 714/4; 379/21
See application file for complete search history.

(56) References Cited

U.S. PATENT DOCUMENTS

| | | | |
|---|---|---|---|
| 5,778,381 A * | 7/1998 | Sandifer ............... 707/104.1 |
| 5,905,866 A * | 5/1999 | Nakabayashi et al. ...... 709/223 |
| 6,122,740 A * | 9/2000 | Andersen .................... 713/200 |
| 6,128,601 A * | 10/2000 | Van Horne et al. .......... 705/34 |
| 6,154,790 A * | 11/2000 | Pruett et al. .................. 710/15 |
| 6,192,044 B1 * | 2/2001 | Mack .......................... 370/352 |
| 6,278,993 B1 * | 8/2001 | Kumar et al. ................... 707/3 |
| 6,292,540 B1 * | 9/2001 | Chea et al. .................... 379/21 |

(Continued)

OTHER PUBLICATIONS

Hasenstein, Michael. Diplomarbeit: IP Network Address Translation. <http://www.suse.de/~mha/HyperNews/get/linux-ip-nat.html>. 1997. pp. 1-13.*

(Continued)

*Primary Examiner*—Thong Vu
(74) *Attorney, Agent, or Firm*—Thomas, Kayden, Horstemeyer & Risley LLP

(57) ABSTRACT

A troubleshooting portal method for providing connectivity between a first communication device and a second communication device. The second communication device resides in an access provider communication system. One embodiment comprises receiving a specification from a user by the first communication device, the specification comprising at least one predefined identifier that identifies the second communication device, and receiving a request to establish connectivity between the user and the second communication device; associating the predefined identifier with said second communication device; establishing connectivity between the first communication device and the second communication device based upon the specified predefined identifier; receiving at least troubleshooting data and a test from the user; and communicating the received troubleshooting data and the test to the second device.

57 Claims, 7 Drawing Sheets

U.S. PATENT DOCUMENTS

| | | | |
|---|---|---|---|
| 6,339,595 B1* | 1/2002 | Rekhter et al. | 370/392 |
| 6,353,390 B1* | 3/2002 | Beri et al. | 340/572.1 |
| 6,381,579 B1* | 4/2002 | Gervais et al. | 705/8 |
| 6,434,615 B1* | 8/2002 | Dinh et al. | 709/224 |
| 6,459,702 B1* | 10/2002 | Saaverda et al. | 370/422 |
| 6,557,054 B2* | 4/2003 | Reisman | 710/33 |
| 6,574,239 B1* | 6/2003 | Dowling et al. | 370/469 |
| 6,584,074 B1* | 6/2003 | Vasamsetti et al. | 370/254 |
| 6,597,689 B1* | 7/2003 | Chiu et al. | 370/354 |
| 6,625,114 B1* | 9/2003 | Hassell | 370/216 |
| 6,633,912 B1* | 10/2003 | Welter et al. | 709/224 |
| 6,697,376 B1* | 2/2004 | Son et al. | 370/465 |
| 6,711,610 B1* | 3/2004 | Harris | 709/217 |
| 6,731,625 B1* | 5/2004 | Eastep et al. | 370/352 |
| 6,732,178 B1* | 5/2004 | Van Horne et al. | 709/227 |
| 6,779,030 B1* | 8/2004 | Dugan et al. | 709/223 |
| 6,820,049 B1* | 11/2004 | Monroe et al. | 703/21 |
| 6,996,067 B1* | 2/2006 | Burke et al. | 370/248 |
| 7,069,291 B2* | 6/2006 | Graves et al. | 709/201 |
| 7,069,328 B1* | 6/2006 | Bell | 709/227 |
| 7,200,683 B1* | 4/2007 | Wang et al. | 709/250 |
| 2001/0034771 A1* | 10/2001 | Hutsch et al. | 709/217 |
| 2002/0021675 A1* | 2/2002 | Feldmann | 370/254 |
| 2002/0057671 A1* | 5/2002 | Kikinis | 370/352 |
| 2003/0105854 A1* | 6/2003 | Thorsteinsson et al. | 709/223 |
| 2004/0215490 A1* | 10/2004 | Duchon et al. | 705/2 |
| 2005/0089052 A1* | 4/2005 | Chen et al. | 370/401 |
| 2007/0033528 A1* | 2/2007 | Merril et al. | 715/732 |

OTHER PUBLICATIONS

Sheresh, B; Sheresh, D; Cowart, R. Proxy Server 2.0. <http://windowsitlibrary.com/Content/405/27/1.html>. Apr. 1999. pp. 1-5.*

Doyle, Casey D. Microsoft Press Computer Dictionary. 1994. Second Edition. p. 182.*

Montenegro, G; Gupta, V. RFC 2356- Sun's SKIP Firewall Traversal for Mobile IP. Jun. 1998. p. 4.*

Medical Portals: Web-Bassed Access to Medical Information; M.Shepherd et al; IEEE 2000.*

Architecture Walkthroughs Using Portal Texture; D.G. Aliaga et al IEEE 1999.*

* cited by examiner

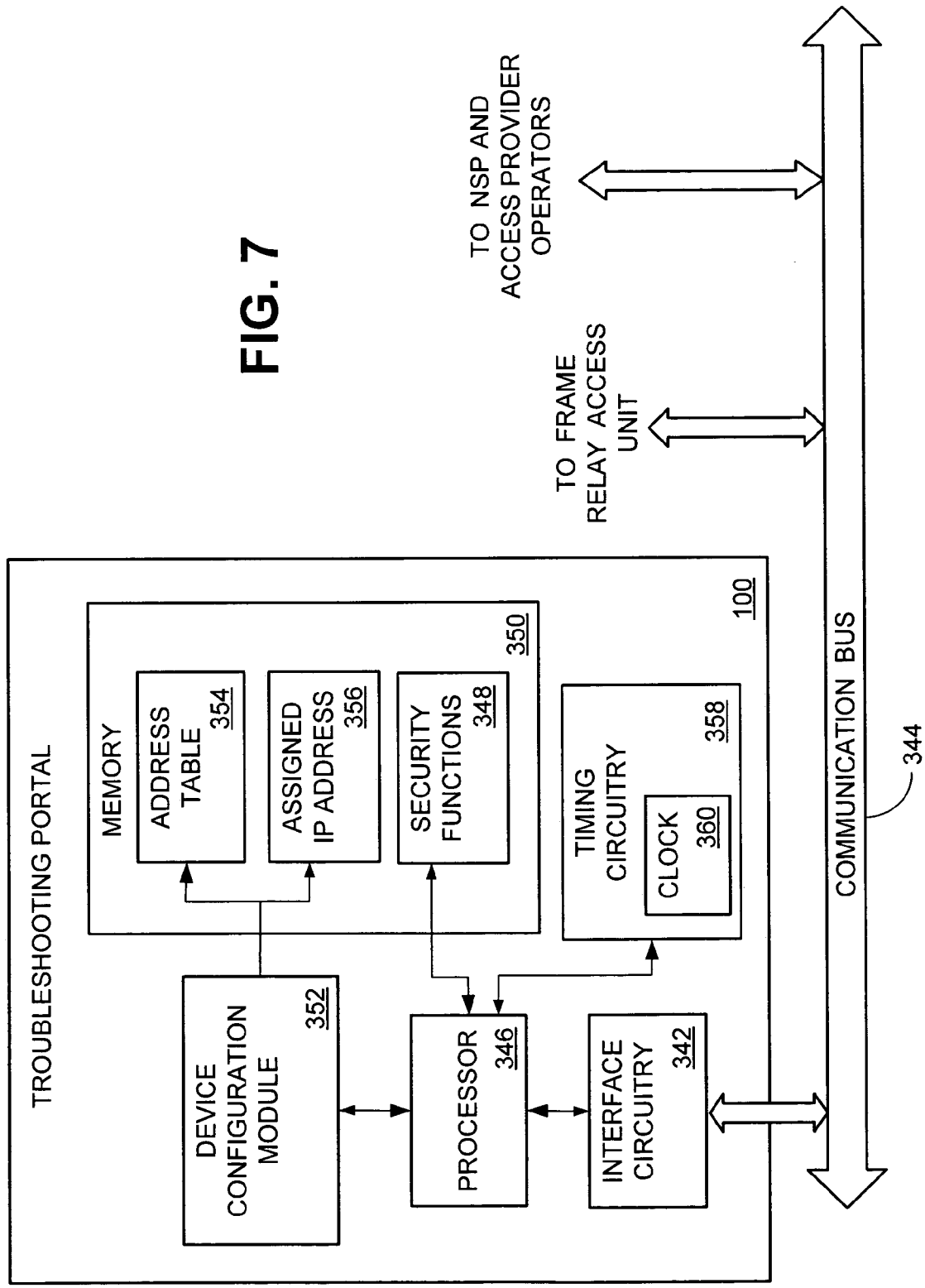

SYSTEM AND METHOD FOR A TROUBLE SHOOTING PORTAL TO ALLOW TEMPORARY MANAGEMENT ACCESS TO A COMMUNICATION DEVICE

CLAIM OF PRIORITY

This application claims priority to copending U.S. provisional application entitled, "SYSTEM AND METHOD FOR A TROUBLESHOOTING "PORTAL" TO ALLOW TEMPORARY MANAGEMENT ACCESS TO A DEVICE BY A SERVICE PROVIDER WHEN ACCESS PROVIDER'S NETWORK TOPOLOGY IS A LINK LAYER OR NETWORK LAYER TOPOLOGY" having Ser. No. 60/186,136, filed Feb. 10, 2000, which is entirely incorporated herein by reference, and copending U.S. provisional application entitled, "SYSTEM AND METHOD FOR A TROUBLESHOOTING "PORTAL" TO ALLOW TEMPORARY MANAGEMENT ACCESS TO A DEVICE BY A SERVICE PROVIDER WHEN THE ACCESS PROVIDER'S NETWORK TOPOLOGY IS A LINK LAYER OR NETWORK LAYER TOPOLOGY" having Ser. No. 60/181,633, filed Mar. 1, 2000, which is entirely incorporated herein by reference.

TECHNICAL FIELD

The present invention relates generally to data communications, and more particularly, to a system and method for a troubleshooting portal which allows temporary management access by a service provider to a device residing on an access provider network.

BACKGROUND OF THE INVENTION

In the field of data communications, communication equipment such as a modem, a data service unit (DSU), or a channel service unit (CSU) is used to convey information from one location to another. Digital technology now enables modems or other communication devices, such as frame relay data service units (DSU's), frame relay access units (FRAU's), and asynchronous transfer mode (ATM) communication devices to communicate large amounts of data in a packetized digital format. This packetized digital communication format generally adheres to a model, such as the well known Open Systems Interconnect (OSI) seven-layer model, which specifies the parameters and conditions under which information is formatted into a digital data packet and transferred over a communications network.

Frame relay networks, well known in the art, are one implementation of a packet-switching network. A packet-switching network allows multiple users to share data network facilities and bandwidth, as contrasted with a circuit-switching network which provides a specific amount of dedicated bandwidth to each user. Packet switches divide bandwidth into virtual circuits (VC). Virtual circuits, also known as circuit identifiers, can be a permanent virtual circuit (PVC) or a switched virtual circuit (SVC). As is well known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay systems generally operate within layer 2 (the data link layer) of the OSI model, and are an improvement over previous packet switching techniques, such as X.25, in that a frame relay system requires significantly less control overhead.

FIG. 1 illustrates a communication environment 22 having an access provider network 24 and a network service provider (NSP) network 26. Typically, communication environment 22 would have a plurality of networks (not shown) interconnected together via communication links as described hereinafter. An example of a network is the public switched telephone network (PSTN) or a public data network (PDN). Access to the network is provided by an access provider. These access providers generally provide the communication and switching facilities over which the above-mentioned communication devices operate. Because of the evolution of the communication system from a plain old telephony system (POTS), originally designed to handle analog voice communications, to today's communication network capable of operating over a variety of physical connection systems using a variety of communication formats, the communication system employed today which provides both analog POTS voice capability and digital data capability is quite complex. Often, special interface devices are needed to provide connectivity between the different types of communication hardware and information formats. For example, a user of a digital data system for accessing the Internet may be employing an entirely different technology than the communication system employed by access provider network 24 which may be employing an ATM based communication network.

Typically, a user contracts with a network service provider (NSP) for network services. These networks typically sell network services, in the form of connectivity, to users. As illustrated in FIG. 1, the service provider's network 26 is shown to be separate from and adjacent to the access provider network 24. In instances where the user has contracted with the access provider for service, the access provider would also be the network service provider. On the other hand, the access provider and the NSP may be different entities. In this situation, the NSP may be far removed from the user, and connectivity between the user and the network service provider may be provided through one or more different access provider networks (not shown). Therefore, one skilled in the art will realize that FIG. 1 is provided as a simplified illustrative example of a portion of a communication environment 22.

A user may purchase a particular level of service from the NSP (not shown). This level of service can be measured by, for example, network availability as a percentage of total time on the network, the amount of data actually delivered through the network compared to the amount of data attempted or possibly the network latency, or the amount of time it takes for a particular communication to traverse the network. Often, an NSP may provide services to the user by specifying a committed information rate (CIR). The CIR is the minimum data communication rate that the NSP guarantees to the user. The CIR is typically some fraction of the total available line rate of the particular service being provisioned. For example, in a frame relay network, the line rate may be 1536000 bits/second (T1 rate including 24 64-kilobit (KB) channels for a total of 1.544 megabits/second (MB/s) including 8 KB signaling), while the CIR may be 48000 bytes/second (384000 bits/second (b/s)). That is, for this example, the NSP may guarantee a communication rate of 384000 b/s, while the total available line rate may be 1536000 b/s.

FIG. 1 shows a simplified illustrative communication environment 22 in which a plurality of user devices 28 and 30 reside. Each user device 28 and 30 is connected to a communication device 32 and 34, respectively, such as a frame relay or ATM access unit, via connections 36 and 38, respectively. User devices 28 and 30 are typically customer premises equipment, such as routers or the like, which may be connected to a local area network (LAN) or the like and residing off the access provider network 24. One skilled in the art will realize that the above-described communication devices and user devices may be of any of a wide variety of devices commonly employed in the industry.

For simplicity and as an example, only two communication devices 32 and 34, are depicted in FIG. 1. In practice, a communication environment 22 will contain many communication devices. Communication devices 32 and 34 are commonly considered communication endpoints and communicate with each other over an access provider network 24, in a conventional manner. The term communication device and endpoint are intended to be equivalent and are used interchangeably hereinafter. Access provider network 24 can be, for example, any network that provides connectivity for communication devices 32 and 34, and in the simplified illustrative example of FIG. 1, the portion of the access provider network shown is an ATM communication network. Access provider network 24 illustratively connects to communication devices 32 and 34 over connections 40 and 42, respectively. Connections 40 and 42 can be physical links and can be, for example but not limited to, T1/E1 service, digital subscriber line or loop (DSL), or any digital data service (DDS).

Access provider network 24 and NSP network 26 are typically characterized by a mesh network of links interconnecting a matrix of intermediate nodes (not shown) through switches, such as switches (S) 46, 48, 50, 52, 54 and 56, which are well known in the art. Communication links provide the physical connections between switches. For example, link 58 connects switches 46 and 48. Other links 60, some of which are shown as dotted lines for illustrative purposes, provide physical connections between other switches. For simplicity and as an example, only a limited number of switches and links are illustrated herein; however, access provider network 24 and NSP network 26 will typically contain many switching devices and links.

An operations center (OC) 62 is shown residing in access provider network 24. Within the OC 62 resides some of the control facilities necessary to maintain and operate the access provider network 24. As an illustrative example, a computer terminal 64 is shown residing in the OC 62. Computer terminal 64 interfaces with access unit (AU) 68 via connection 70 to provide an access provider operator management access to the various components of the access provider network 24. For further illustrative purposes, access unit 68 in OC 62 is shown connected to switch 52 via link 72 and connected to switch 48 over link 74. Additional links 60 may be used to connect to other switches throughout the access provider network 24 as necessary for the maintenance and operation of the access provider network 24. One skilled in the art will appreciate that an OC 62 will likely contain many computer terminals, switches and links which are not shown in the simplified illustrative example of FIG. 1.

FIG. 1 also illustrates a simplified NSP network 26. This simplified NSP network 26 is shown to have one switch 76. Also shown residing in the simplified NSP network 26 is an operations center (OC) 78. Residing in OC 78 is computer terminal 80 which interfaces with access unit 82 via line 84. Access unit 82 is connected to switch 76 via link 86. Connectivity between NSP network 26 is provided by link 88, which connects switch 76 with switch 48. Similar to access provider network 24, NSP network will likely have many computer terminals, switches, access units and links (not shown).

As part of the contract between a user and the NSP (not shown), a service contract may provide for servicing of the user's communication devices or other communication facilities which provide connectivity for the user to the access provider network 24 and/or NSP network 26. If the contract provides for a fully managed service, the NSP operator, typically working at the NSP's OC 78, would access the communication device on a regular basis to ensure the proper functioning of the communication device. If the access provider and the network provider are the same entity, then the access provider operator can easily establish access to a communication device through access provider network 24. For example, if the owner of user device 28 has contracted with the access provider, then access provider operator working out of OC 62 may access communication device 32 from computer terminal 64 by establishing a VC path from switch 68 to switch 48 via link 74, from switch 48 to switch 46 via link 58, and from switch 46 to communication device 32 over link 40.

Individual links in a frame-relay network are typically defined by data link connection identifiers (DLCIs), which are commonly used to identify the logical connection over which data communications are transported. PVCs are virtual circuits employed in an asynchronous transfer mode (ATM) network and/or a frame relay system. The use of frame relay DLCIs allows multiple logical connections to be multiplexed over the same channel. Alternatively, in the case of an ATM network, virtual path identifiers/virtual channel identifiers (VPI/VCIs) are used to identify the logical connection over which the data is transported. Here, in this simplified illustrative example of establishing connectivity between OC 62 and communications device 32, a series of VPI/VCIs would define the path 90 between switch 68 and communication device 32. The VPI/VCIs are shown as dash, double-dotted lines between the switches and parallel to the links to which a virtual circuit has been assigned. The series of frame relay DLCIs and/or ATM VPI/VCIs form a single path referred to as a virtual circuit (VC). A virtual circuit may be a permanent virtual circuit (PVC) such that the circuit is permanently established, or the VC may be a switched virtual circuit (SVC) which may be established as needed. In this simplified illustrative example where the owner of user device 28 has contracted with the access provider for network service, access provider operator working in OC 62 can access communication device 32 over VC path 90 (as denoted by the series of VPI/VCIs and/or DLCIs) to provide for the contracted services. For example, the access provider operator may be interested in assessing the performance of communication device 32 to determine if there are any dropped frames, if there is any bursting above CIR by the customer, and/or if there are any linked management interface (LMI) problems at a switch.

Alternatively, the owner of user device 28 may have contracted with a network service provider who is not the access provider. As shown in the simplified communication environment 22 of FIG. 1, the contracted network services may have to be provided from NSP network 26 through access provider network 24. In this situation, an NSP operator working from OC 78 may have to access communication device 32. The NSP operator would first have to contact the access provider operator working in OC 62, via communications path 94, with a request to establish connectivity between switch 50 and communication device 28. Here, a communications path 94 is shown connecting OC 78 with OC 62. Communications path 94 could be a POTS telephone line, a microwave channel, a satellite link, a radio channel or other commonly employed communication means. Then, VC 92 is established from switch 82 residing in OC 78 to the communication device 32. In this illustrative example, the VC 92 would be established over links 86, 88, 58 and 40. VC 92 may be either a PVC or an SVC depending upon a variety of factors, such as the nature of the agreement between the NSP and the access provider.

This process of manually requesting and then establishing a VC 92 from the NSP 26 to communication device 32 through an access provider's network 24 creates several problems and inefficiencies. First, it takes time for NSP operator to contact the access provider operator to request the establishment of PVC 92. This time equates to personnel expenses and inefficient use of personnel time. Furthermore, either operator may be needlessly distracted from higher priority tasks when initiating or responding to requests to establish PVC 92.

Also, the access provider operator may need to verify that the request to establish PVC 92 is authorized. That is, it would be undesirable for the access provider to allow unauthorized access to communication device 32. Verification of the requesting parties' authority to access communication device 32 equates to an added cost and additional personnel time inefficiencies.

Additionally, manual establishment of VC 92 requires time and effort from the access provider operator, thereby resulting in another inefficient use of personnel time and money.

A related problem arises from the inefficient use of Internet Protocol (IP) addresses. When a large number of communication devices and their associated VCs are to be established and maintained on an on-going basis, a corresponding large number of IP addresses are utilized. Given that there are a limited number of IP addresses available, there is a need to provide the necessary access to communication devices without the associated inefficient use of IP addresses.

A related problem may be imposed upon the user. When the user is not able to communicate at CIR, the user may begin incurring costs associated with the degraded performance. The user will likely then contact the NSP operator to complain about the degraded service and request remedial actions to fix the problem. Because establishing VC 92 is a time consuming and labor intensive process, a substantial length of time may be required before the user's service level is re-established up to the CIR. Therefore, the user may incur costs associated with the degraded performance until the NSP (not shown) has accessed the communication device, diagnosed the problem, and completed remedial actions. Reducing the time period to implement remedial actions would benefit the user.

Therefore, it would be desirable to provide a quick, reliable, efficient, and inexpensive method to establish a VC between a network service provider and a customer.

SUMMARY OF THE INVENTION

The present invention provides a system and method which utilizes a troubleshooting portal to instruct a switch in a communication system to provide a connection between a first communication device residing in an access provider network and a second communication device residing in a network service provider (NSP) network. An NSP operator establishes a session with the troubleshooting portal, typically residing in an access provider's network. The troubleshooting portal verifies that the NSP operator is authorized to have access to the requested communication device. After authorization is verified, one embodiment of the troubleshooting portal routes management traffic between the NSP operator and a digital subscriber loop (or digital subscriber line) access multiplexer (DSLAM) or similar switching device which uses a single VC from the access provider operation center to the DSLAM or switching device. The DSLAM or switching device then routes the management traffic to the desired communication device. Another embodiment of the troubleshooting portal instructs a switch to couple a virtual circuit (VC) defining a connection between the NSP operator and a predefined switch residing in the access provider system with a predefined VC defining a path between the predefined switch and the requested communication device. Additionally, the NSP operator may specify an internet protocol (IP) address to be associated with the requested endpoint. Once the troubleshooting portal has enabled connectivity between the NSP operator and the requested communication device, the NSP operator can conduct the necessary troubleshooting tests and other service functions via the portal connection as required by the contract arrangement between the NSP and the owner of the communication device.

The troubleshooting portal allows the access provider to predefine a plurality of VCs associated with a plurality of communication devices that NSPs should have access to on an occasional or a frequent basis. In the preferred embodiment, an address table or the like would reside in a memory residing in the troubleshooting portal. Once endpoints are associated with circuit identifiers and VCs in the address table, access providers will not be disturbed or distracted from their work when an NSP operator desires to establish connectivity to a communication device. The NSP operator establishes a session with the troubleshooting portal that automatically provides connectivity between the NSP operator and any one of the plurality of communication devices. The NSP operator need only specify a circuit identifier or some other suitable endpoint identifier to the troubleshooting portal. The address table may associate the circuit identifier specified by the NSP operator with an IP address from the access provider's domain which has been permanently assigned to the endpoint. If no permanent IP address has been assigned to the endpoint by the access provider, an IP address could then be selected from a pool of reusable IP addresses and assigned to the endpoint for the duration of the session.

Alternative embodiments of a troubleshooting portal would provide for a plurality of NSPs having access to a plurality of communication devices connected to the access provider system. Another alternative embodiment of the troubleshooting portal would provide for a plurality of portal servers sharing a common external address table for purposes of load balancing and redundancy.

A security feature employed by an alternative embodiment of the troubleshooting portal would allow any particular NSP operator to have access only to those communication devices for which the operator is authorized to access. This alternative embodiment would limit access to any particular communication device to only the NSP operator for which a service contract exists. Unauthorized access by other operators would be prevented.

An alternative embodiment of the troubleshooting portal may provide for access provider operators to establish connections with communication devices having predefined IP addresses residing in the above-described address table. Another alternative embodiment of the troubleshooting portal would employ network address translation (NAT) such that the address table residing in the troubleshooting portal would be able to associate circuit identifiers (ID) provided by the NSP operator with another predefined IP address in the address space of the access provider. A circuit ID is a unique identifier agreed upon by the access provider and the NSP to identify a circuit which traverses both networks. Another alternative embodiment of a troubleshooting portal would employ a proxy or a NAT system whereby the IP address provided by the NSP operator would be associated with an IP address selected from a pool of temporary IP addresses in the access provider's IP address domain associated with the desired communication devices, thereby providing for the use of repeatable IP addresses that may be globally unique locally scoped (GULS). In this embodiment, the troubleshooting portal performs IP proxying or NAT to enable the NSP to use their own IP addresses to access the communication devices even though the communication devices have really been assigned IP addresses in the access providers address space.

The present invention may be viewed as providing a method for enabling connectivity between first and second communication devices, as follows: accessing a troubleshooting portal by establishing a session, specifying a predefined endpoint corresponding to the communication device for which access is desired, associating the specified endpoint with the communication device and finally establishing a connection between the NSP operator and the requested communications device. The method may also include verifying security access wherein a right to access the requested communication device is verified and where the connection is established only after the right to access is verified. The method may also include specifying an IP address and associating the IP address with the communication device.

Other systems, methods, features, and advantages of the troubleshooting portal will be or become apparent to one with skill in the art upon examination of the following drawings and detailed description. It is intended that all such additional systems, methods, features, and advantages be included within this description, be within the scope of the troubleshooting portal, and be protected by the accompanying claims.

BRIEF DESCRIPTION OF THE DRAWINGS

The troubleshooting portal can be better understood with reference to the following drawings. The components in the drawings are not necessarily to scale, emphasis instead being placed upon clearly illustrating the principles of the troubleshooting invention. Moreover, in the drawings, like reference numerals designate corresponding parts throughout the several views.

FIG. 7 is a block diagram of the components of a preferred embodiment of the troubleshooting portal of FIG. 2.

DETAILED DESCRIPTION OF THE PREFERRED EMBODIMENT

Figure 1:
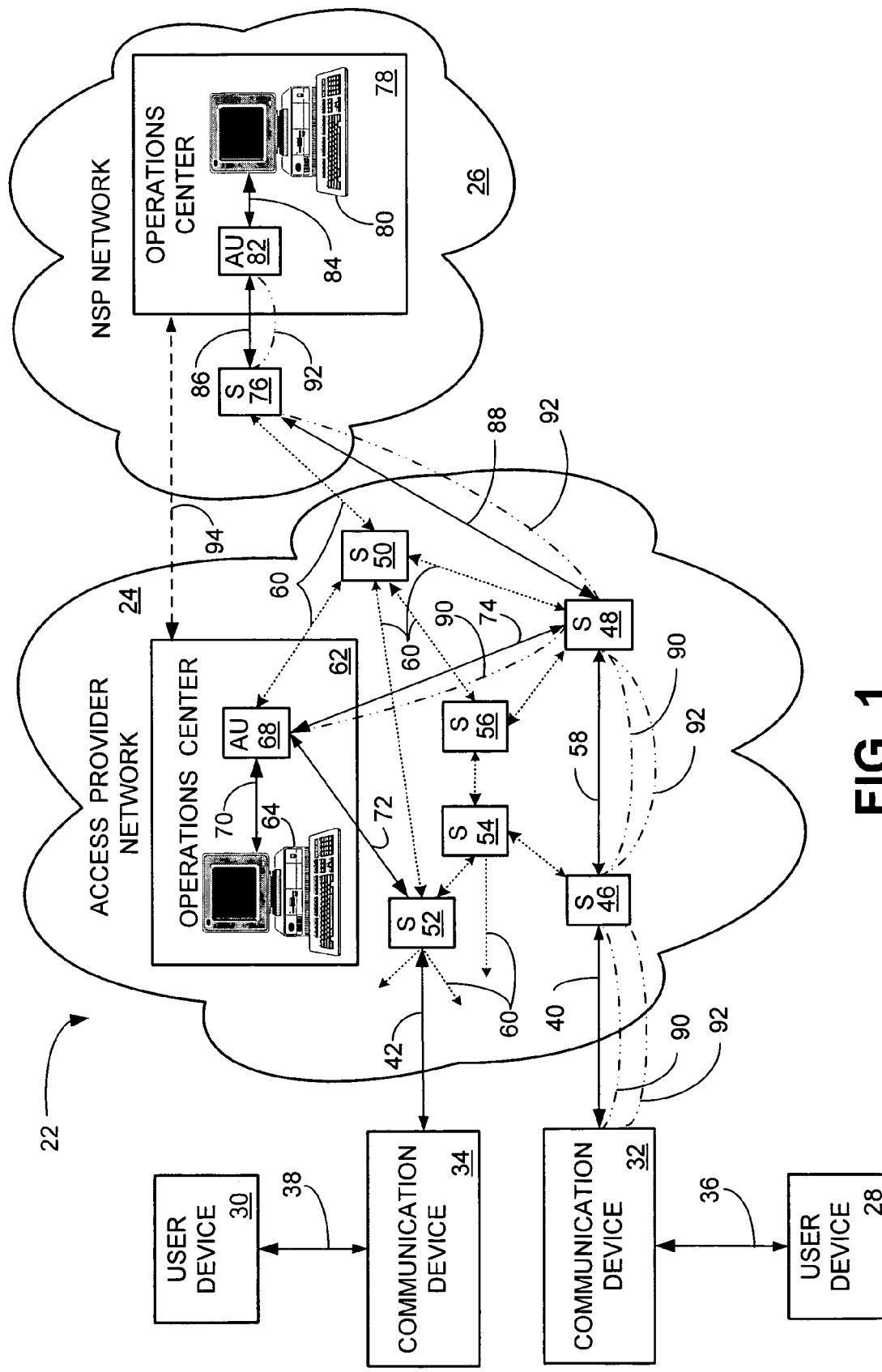
FIG. 1 is a prior art block diagram illustrating a simplified communication environment with an access provider network, a network service provider (NSP) network, two communication devices and two user devices.

The troubleshooting portal logic of the troubleshooting portal in accordance with the present invention can be implemented in software, hardware, or a combination thereof. In a preferred embodiment, the troubleshooting portal logic is implemented in software that is stored in a memory and that is executed by a suitable microprocessor (uP) situated in a server or servers that are located in the access providers network operations center. However, the troubleshooting portal program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, if necessary, and then stored in a computer memory.

In a preferred embodiment, although not limited to this particular limitation, the troubleshooting portal may be implemented as software executed by a computer. Alternative troubleshooting portal embodiments may be implemented by hardware or by a combination of hardware and software executed by a processor. When the troubleshooting portal is implemented in part or entirely by software, the processor executing the troubleshooting portal software may be employed as part of another system and shared by the troubleshooting portal, or, the processor may be a dedicated element of a troubleshooting portal. Any such alternative embodiments of a troubleshooting portal are intended to be within the scope of this disclosure and be protected by the accompanying claims for the troubleshooting portal.

Furthermore, the preferred embodiment of the troubleshooting portal is illustrated and described in the context of a communications network having an ATM based portion and a frame relay based portion; however, the concepts and principles of the troubleshooting portal logic are equally applicable to other communication techniques, such as, but not limited to, X.25, Internet protocol (IP) routed, multiprotocol label switching (MPLS) or the like. Similarly, alternative embodiments of a troubleshooting portal may not reside inside of or as part of a server, but rather may be a separate device located adjacent to the server or may be located in another convenient location and simply communicate with the server as needed to implement the functionality of the troubleshooting portal. Any such alternative embodiments of the troubleshooting portal are intended to be within the scope of this disclosure and be protected by the accompanying claims for the troubleshooting portal.

Figure 2:
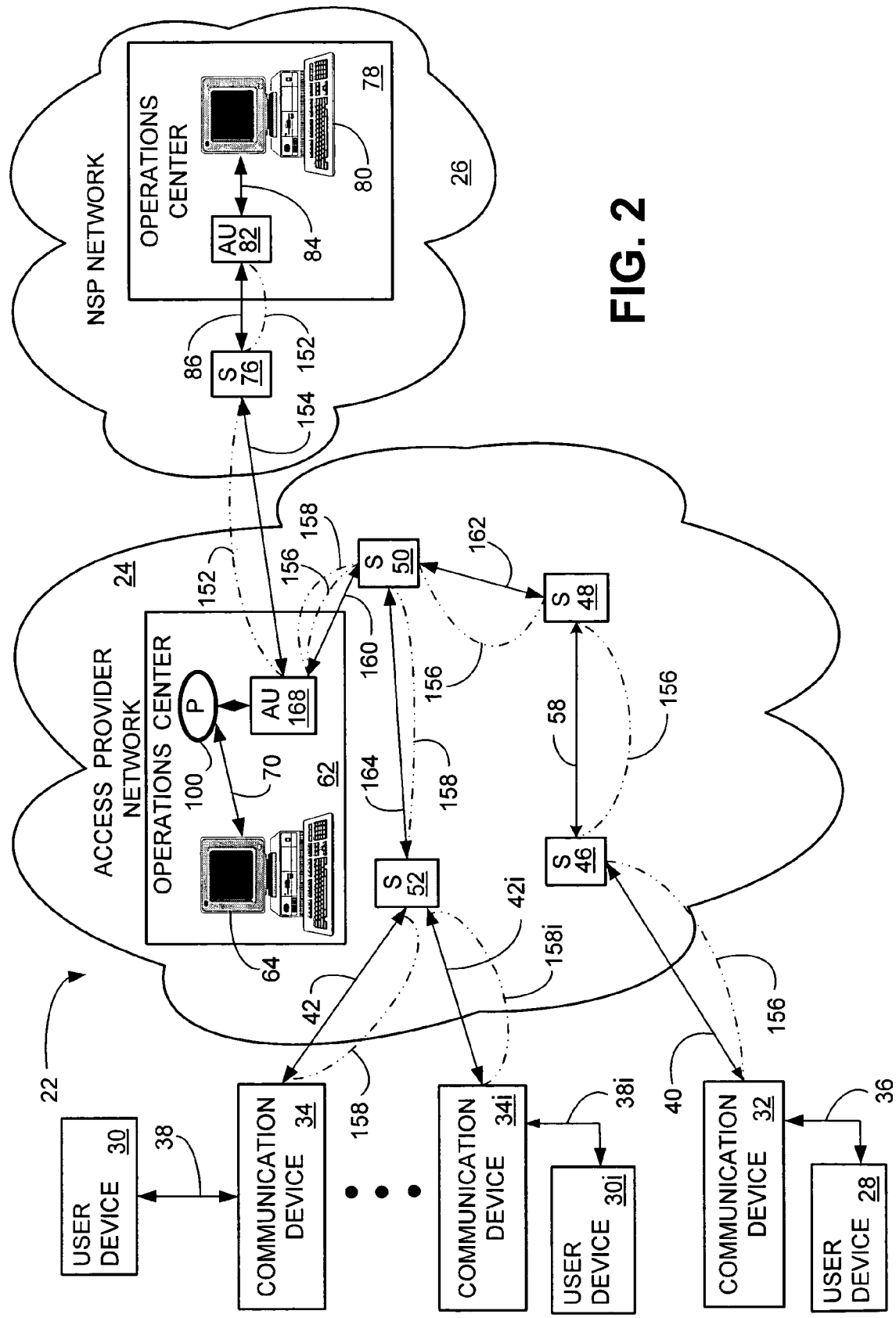
FIG. 2 is a block diagram of portions of the simplified communication environment shown in FIG. 1 detailing a possible location of a preferred embodiment of the troubleshooting portal and the associated virtual circuits to the communication devices.

FIG. 2 shows an illustrative example of a communication environment 22 in which a troubleshooting portal (P) 100 may reside. Elements in FIG. 2 that are similar to those in FIG. 1 bear the same reference numerals. Such elements having the same reference numerals in FIGS. 1 and 2 may be considered to be like elements, however, since these like numeraled elements are incidental to the operation of the troubleshooting portal 100 which utilizes existing portions of communication network 22, one skilled in the art will realize that elements in FIGS. 1 and 2 need not be identical, as any variations of such elements will not adversely affect the functioning and performance of the troubleshooting portal 100.

A preferred embodiment of troubleshooting portal 100 is implemented on a processor based device such as, but not limited to, a server or a PC. If implemented as a processor, such a processor is typically a commercially available processor. Examples of commercially available processors include, but are not limited to, a Pentium microprocessor from Intel Corporation, Power PC microprocessor, SPARC processor, PA-RISC processor or 68000 series microprocessor. Many other suitable processors are also available. The troubleshooting portal 100 is connected to and in communication with access unit 168. Alternative embodiments of a troubleshooting portal 100 may be connected to any commonly employed communication device which provides connectivity to access provider network 24, and which operates on a link layer or above, as described hereinafter (see also FIG. 3). Additionally, alternative embodiment to the troubleshooting portal 100 may be implemented on other types of well-known layered communication environments such as, but not limited to, ATM digital subscriber loop (DSL), IP, or the like.

The troubleshooting portal 100 can be accessed and operated by a general purpose computer or other type of interface device whereby an operator can monitor and control the operation of troubleshooting portal 100. In the simplified illustrative example shown in FIG. 2, computer terminal 64 is shown to be connected to troubleshooting portal 100, which may be implemented in a server (not shown), via link 70. An operations center operator can then access and operate router 168 by providing instructions to the troubleshooting portal 100. In alternative embodiments of the troubleshooting portal 100, the access to troubleshooting portal 100 could be provided by indirectly linking computer terminal 64 and troubleshooting portal 100 through an intermediary device such as a server, by implementing troubleshooting portal 100 in computer terminal 64, linking computer terminal 64 and troubleshooting portal 100 through a communications network such as a LAN or Ethernet or the like, or any other commonly employed techniques for providing interconnectivity between communication devices. Any such alternative embodiments of the troubleshooting portal 100 are intended to be within the scope of this disclosure and the claims of troubleshooting portal 100.

The troubleshooting portal 100 provides the NSP operator an effective, efficient and inexpensive way to quickly access a plurality of communication devices, such as communication devices 34 and/or 32, which are connected to access provider network. Furthermore, as explained in detail hereinafter, NSP operators working from OC 78 need not contact access provider operators working in OC 62 for authorization to access the communication devices 32 and/or 34, nor does the access provider operator in OC 62 have to spend time (or money) in establishing VCs from the interface point with NSP network 26, through access provider network 24, to communication devices 32 an/or 34.

Figure 3:
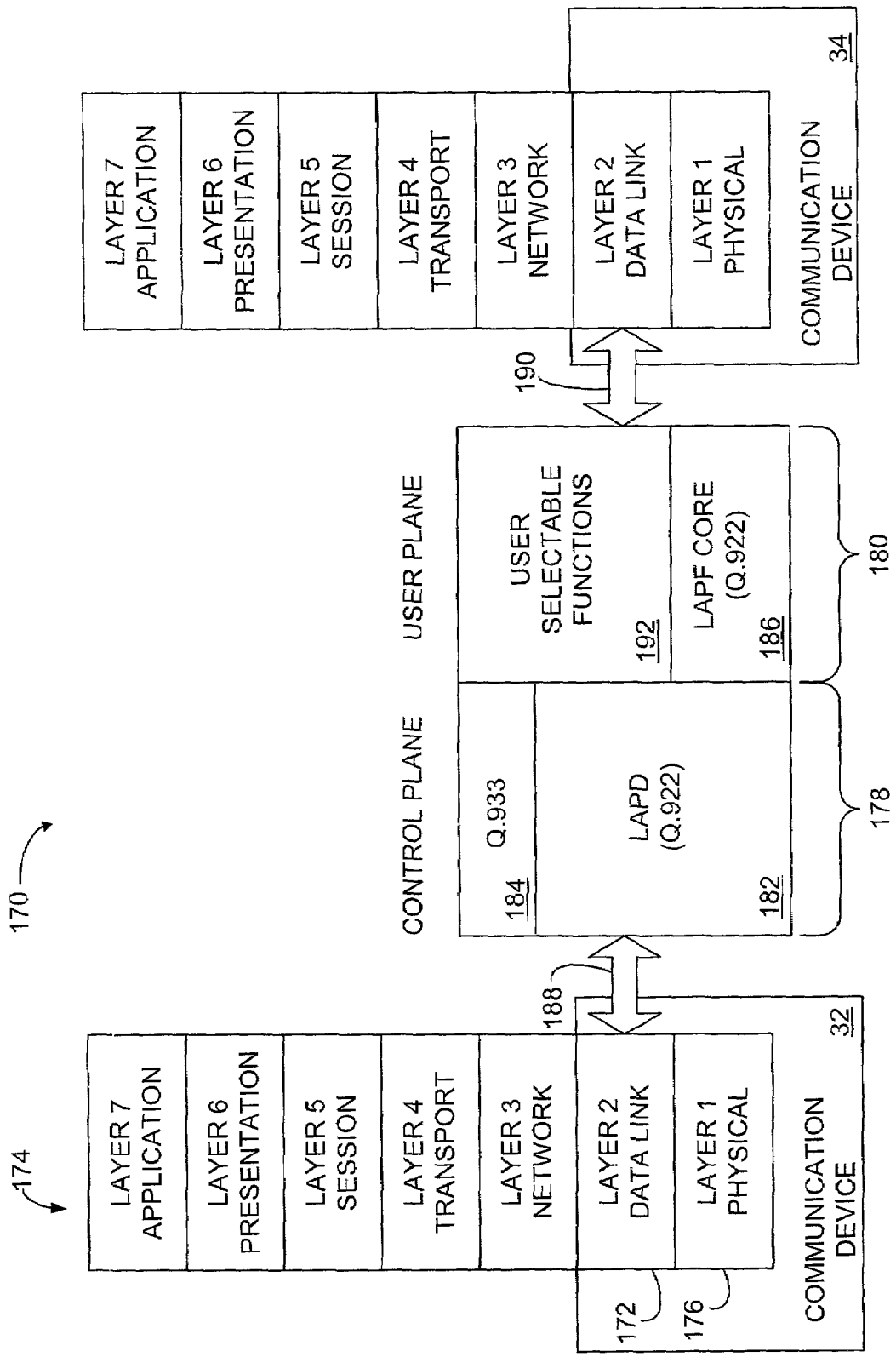
FIG. 3 is a block diagram of a network model illustrating a framework within which the preferred embodiment of the troubleshooting portal resides.

FIG. 3 shows a block diagram of a network model 170 illustrating the layered framework within which the preferred embodiment of the troubleshooting portal 100 (FIG. 2) resides. However, alternative embodiments of the troubleshooting portal 100 may reside and operate in communication systems employing other standards and protocols. Examples of such communication systems include, but are not limited to, ATM, X.25, IP routed, MPLS or the like. Any such alternative embodiments of a troubleshooting portal 100 are intended to be within the scope of this disclosure and be protected by the accompanying claims for the troubleshooting portal 100.

As previously described, communication devices 32 and 34 (see also FIG. 2) may be the type of device that connects user equipment to a frame relay or ATM network, such as access provider network 24 (FIG. 2). Communication devices 32 and 34 typically communicate over a frame relay network using Layer 2, or the data link layer 172, of the OSI seven layer model 174. Communication devices 32 and 34, however, are each also aware of layer 1, or the physical layer 176, of the OSI seven layer model, since it is a physical layer access device, such as a DSU.

Implemented at the data link layer 172 are the standards and protocols (including the logical management interface (LMI)) that enable the transport of frame relay data. The protocol architecture that supports frame relay transport can be considered to reside in two planes of operation. The control plane 178 and the user plane 180. The control plane 178 allows signaling to control the establishment and termination of transportation services on the user plane 180. At the data link layer 172, LAPD (link access protocol, D channel); (Q.922); (ISDN Data Link Layer Specification For Frame Mode Bearer Services) 182 is used to provide a reliable data link control service with error control and flow control. This data link control service is used for the exchange of Q.933 control signaling messages 184. For the transfer of information between end users, the user plane 180 protocol is LAPF (link access procedure for frame mode bearer services) CORE (Q.922 CORE); (Annex A-Core Aspects Of Recommendation Q.922 For Use With Frame Relay Bearer Service) 186. The protocol Q.922, among other things, includes an address header that is applied to a data packet and provides the addressing for the frame relay packet. Packets are transmitted over links 188 and 190. Network model 170 also provides for user selectable functions 192.

The physical layer represents and includes the hardware connections and physical media that enable the transport of information over the network. An example of such hardware and media is shown in FIGS. 1 and 2.

Other communication systems such as ATM, X.25, IP routed, MPLS or the like may employ an equivalent link layer system to the above-described link layer system for a frame relay based communication network. One advantage provided by the troubleshooting portal 100 is the capability of interfacing a variety of communication systems which may employ different link layer systems and/or data protocols in a manner which provides easy access by a NSP operator to various communication devices.

Returning now to the simplified illustrative example shown in FIG. 2, troubleshooting portal 100 is shown to communicate with router 168. An NSP operator first establishes a session with troubleshooting portal 100 from computer terminal 80. Establishing a session with the troubleshooting portal 100 can be effected by any means commonly employed in the art to establish sessions between a user and a server or other network management system. Computer terminal 80, in the simplified illustrative example of FIG. 2, is connected to router 168 over a predefined VC 152. VC 152 is defined by a series of DLCIs which provide the connectivity between access unit 82 and router 168, via switch 76. As illustrated in this simplified example, access unit 82 is physically connected to switch 76 via link 86, and switch 76 is connected to router 168 via link 154.

Once the NSP operator has established a session with troubleshooting portal 100, the NSP operator may access communication device 32 by specifying the IP address or a like identifier associated with communication device 32, also known as an end point. Typically, the assigned IP address, if used as the identifier, is a public IP address which is officially part of the access provider's address domain. In one embodiment, troubleshooting portal 100 instructs access unit 168 to effectively couple VC 152 with VC 156. Once VC 152 has been coupled with VC 156, the NSP operator has connectivity to communication device 32 and may send troubleshooting data and tests to communication device 32 using the specified IP address.

An alternative embodiment of troubleshooting portal 100 would instruct router 168 to route management traffic between the NSP operator and communication device 32 over VCs 152 and 156.

In another alternative embodiment of troubleshooting portal 100, router 168 would be pre-configured to route NSP management traffic to the troubleshooting portal 100. The troubleshooting portal performs network address translation (NAT) on the NSPs management traffic and routes it back to router 168 for further routing to the communications devices.

In this simplified illustrative example, VC 156 establishes connectivity between router 168 and communication device 32 via switches 50, 46 and 48. VC 156 can be defined by a series of DLCIs associated with links 160, 162, 58 and 40. VC 156 has been predefined by the access provider and is identified in an address table (not shown) residing in memory of trouble shooting portal 100. The address table may also contain a plurality of VCs which may be used to establish connectivity to a plurality of other communication devices. Alternative embodiments of a troubleshooting portal 100 may employ a routing table, network configuration database, Lightweight Directory Access Protocol (LDAP) directory or the like to provide the necessary path and router information to define a VC. Alternative embodiments of a troubleshooting portal 100 may utilize alternative means of identifying these VCs commonly employed in the communication arts. Other alternative embodiments of a troubleshooting portal 100 may access information identifying a VC from an address table or the like which is residing in a location removed from troubleshooting portal 100. For example, the address table or the like may reside in computer terminal 80. Any such alternative embodiments of the troubleshooting portal 100 are intended to be within the scope of this disclosure and the claims of troubleshooting portal 100.

Another alternative embodiment of troubleshooting portal 100 would instruct router 168 to route management traffic to a DSLAM or similarly functioning switch. In the simplified illustrative example shown in FIG. 2, the NSP operator may access communication device 34 through DSLAM 52. The NSP operator would establish a session with troubleshooting portal 100 and specify the identifier associated with communication device 34. Troubleshooting portal 100 would instruct router 168 to route management traffic, via VCs 152 and 158, to DSLAM 52. DSLAM 52 would effect the necessary switching operations such that the management traffic could be delivered over physical link 42 to communication device 34. Typically, DSLAM 52 or a similar functioning switch would be connected to a plurality of communication devices 34-34i. Thus, connectivity to a plurality of communication devices 34-34i can be provided by the troubleshooting portal 100 which would provide the necessary information to DSLAM 52 such that the appropriate switching can occur to provide access to the specified communication device.

In the simplified illustrative example shown in FIG. 2, device 52 may be a DSLAM which provides connectivity between the access provider network 24 and a plurality of endpoints, such as user devices 30 through 30i. The DSLAM provides the routing and switching function for the plurality of endpoints. A single VC 158 identifies the virtual path from DSLAM 52 back to the router 168 in operation center 62. Associated with the DSLAM and/or the portal is the address table which provides a hierarchy based method of associating the endpoint IP address with the circuit ID specified by the NSP operator. Such a table would have a circuit ID for the endpoint which may be associated with an IP address specified in at least three different manners. First, an IP address for the endpoint could be specified by the access provider by assigning a permanent IP address from the access provider's domain of IP address names. Alternatively, in the event that the access provider has not assigned a permanent IP address to the endpoint, the NSP may assign a permanent IP address from the NSP's domain of IP addresses. Or, if neither the access provider or the NSP has assigned a permanent IP address to the endpoint, an IP address may be selected from a pool of available access provider IP addresses and temporarily assigned to the endpoint for the duration of the session. Such an assignment of an IP address from an IP address pool could be implemented in any manner commonly employed in the communication arts. After the IP address for the desired endpoint has been identified in the address table or assigned from the IP address pool, the DSLAM would operate to provide the appropriate connectivity to the desired endpoint.

For example, the NSP operator may desire to establish a connection back to user device 30. The NSP operator would establish a session with troubleshooting portal 100 in the manner described hereinabove. The troubleshooting portal 100 and DSLAM 52 would then associate the IP address and VCs to enable connectivity between the NSP operator and user device 30. The NSP operator would establish connectivity to user device 30*i* by specifying a circuit identifier associated with user device 30*i*, and the troubleshooting portal 100 and DSLAM 52 would then appropriately configure the system to provide a VC 158 and 158*i* (VC 158*i* being associated with link 42*i* which is connected to communication device 34*i*).

When the NSP operator has completed the troubleshooting of the selected communication device, the NSP operator terminates the session with troubleshooting portal 100 by so notifying the troubleshooting portal 100. Ending the session with the troubleshooting portal 100 can be effected by any means commonly employed in the art to terminate sessions between a user and a device. If a temporary IP address from the pool of IP addresses has been assigned by the portal, upon termination of the session, the assigned IP address is released. The released IP address can be used in later established sessions or in other applications.

The VCs 156 and 158 have been predefined by access provider network 24 operators. VCs 156 and 158 may be either SVCs or PVCs as determined by the operators of access provider network 24. The address table residing in troubleshooting portal 100 may also contain a plurality of VCs to provide connectivity to a plurality of other communication devices (not shown) connected to access provider network 24 which NSP operators may desire access to. Once the address table has been established in troubleshooting portal 100, NSP operators may access any communication device for which a predefined VC has been established by simply establishing a session with troubleshooting portal 100 and instructing the troubleshooting portal 100 to provide connectivity (by routing management traffic or by coupling VCs) to the identified communication device or to the DSLAM 52 (or similarly functioning switch) connected to the selected communication device. Access provider operators (not shown), once having established a troubleshooting portal 100, do not need to be contacted by the NSP operator each time the NSP operator wants to access a particular communication device for which a predefined VC has been established and identified in the troubleshooting portal 100 address table.

In the preferred embodiment of a troubleshooting portal 100, the troubleshooting portal 100 is capable of simultaneously supporting a plurality of different users accessing different end points. The number of users who may be simultaneously provided access through a troubleshooting portal 100 and the method of managing access of the users would be determined at the time of the design and implementation of the troubleshooting portal 100.

An alternative embodiment of troubleshooting portal 100 may also contain network security features. Such a user security feature would require the NSP operator to provide credentials or another form of identification during a log-in process, described hereinafter (see step 306 of FIG. 6), before the troubleshooting portal 100 would allow access to the NSP operator. Thus, troubleshooting portal 100 is seen to prevent undesirable unauthorized access to communication devices connected to the access provider network 24. The above-described user security feature may utilize any well known protocol commonly employed in the art which provides the desired security functionality for troubleshooting portal 100. The network security features may be implemented within the troubleshooting portal 100 itself or be implemented by a processor at an alternative location, such as, but not limited to, a server or router typically found in firewalls, on the router 168 (FIG. 2), at the end point communication device, at the computer terminal 80 or at any other convenient location without impacting the operation or functionality of a troubleshooting portal 100.

Access provider operators may also utilize troubleshooting portal 100 to access communication devices connected to access provider network 24. As illustrated in FIG. 2, an access provider operator working from OC 62 may access communication device 34 from computer terminal 64 by establishing connectivity to router 168. The access provider operator would establish a session with troubleshooting portal 100 and then request troubleshooting portal 100 to instruct access unit 168 to provide connectivity to VC 156, thereby providing access to communication device 32, or would instruct troubleshooting portal 100 to provide connectivity to VC 164 to establish access to communication device 34. Similarly, the access provider operator could instruct troubleshooting portal 100 to provide access to any communication device connected to access provider network 24 which has a predefined VC established in the troubleshooting portal 100 address table. Additionally, the above-described security features could be used to limit access by the access provider operators.

Figure 4:
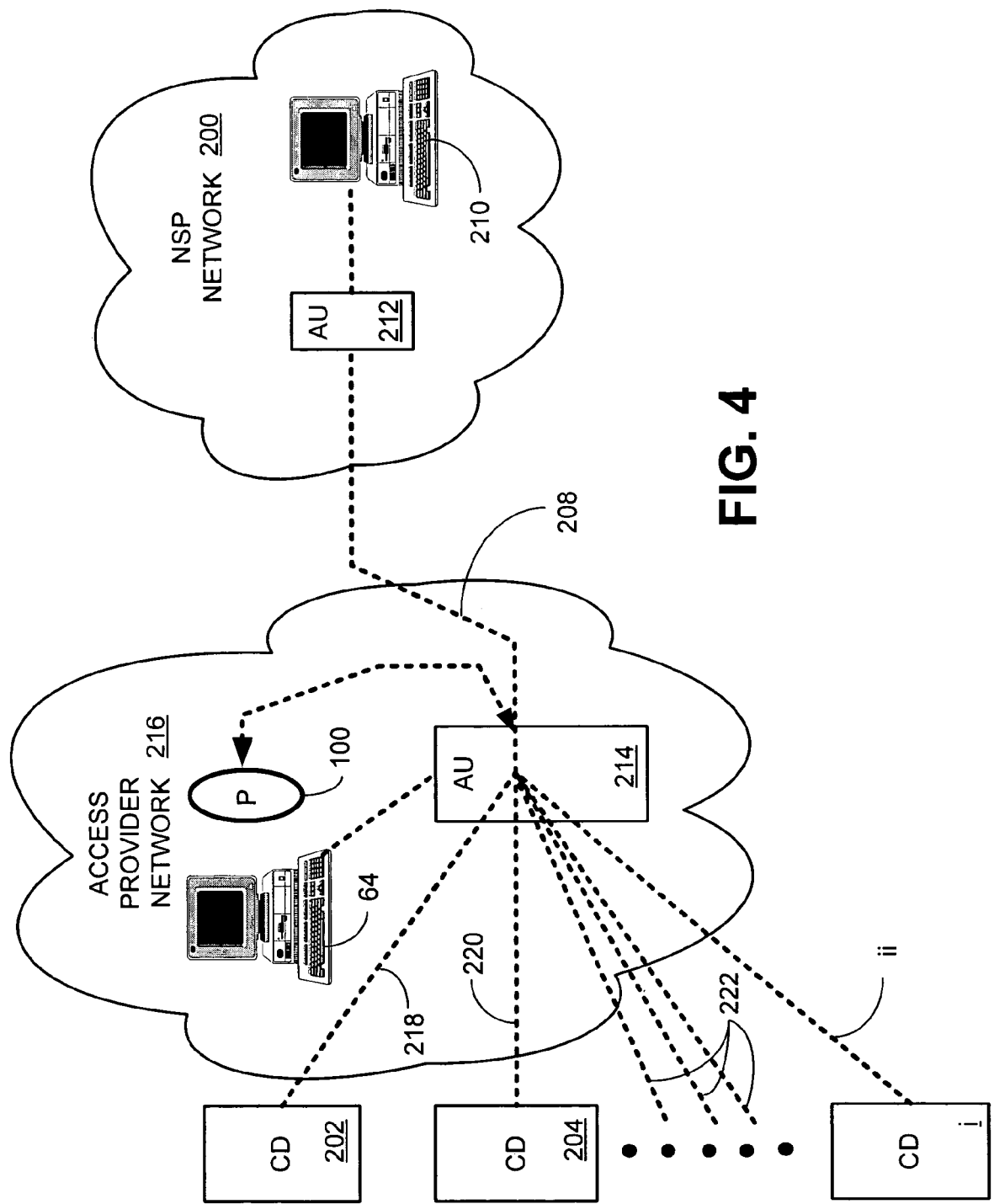
FIG. 4 is a block diagram illustrating the preferred embodiment of the troubleshooting portal of FIG. 2 and a plurality of virtual circuits providing access to a plurality of communication devices.

FIG. 4 is a simplified illustration demonstrating the manner in which troubleshooting portal 100 may provide connectivity to a plurality of communication devices. An NSP operator working in NSP network 200 may desire to establish connectivity to a plurality of communication devices as shown by communication devices 202, 204 and i. The NSP operator would establish connectivity to communication device 202 by first establishing a session with troubleshooting portal 100 over VC 208 and then requesting troubleshooting portal 100 to provide connectivity to communication device 202. One embodiment of troubleshooting portal 100 would then instruct access unit 214 couple VC 208 and VC 218. An alternative embodiment of troubleshooting portal 100 would route management traffic over VC 208 and VC 218.

Alternatively, the NSP operator could establish connectivity with communication device 204 by requesting troubleshooting portal 100 to couple VC 208 with VC 220 or by requesting troubleshooting portal 100 to route management traffic over VC 208 and VC 220. Similarly, the NSP operator could establish connectivity with communications device i by requesting troubleshooting portal 100 to couple VC 208 with VC ii or by requesting troubleshooting portal 100 to route management traffic over VC 208 and VC ii. One skilled in the art will appreciate that the NSP operator can establish connectivity to any communication device which has a predefined VC 222 listed in the address table of the troubleshooting portal 100. One skilled in the art will appreciate that the physical path to which VC 208 has been assigned may have a plurality of switches (not shown) connected together by a plurality of links (not shown). Likewise, VCs 218, 220 and i, may be assigned to a plurality of relay switches and links (not shown). Because a VC defines a path over a physical system having a plurality of switches and a plurality of associated links, a VC will allow the troubleshooting portal 100 to establish connectivity between devices by coupling predefined VCs together.

The functionality of access unit 214 could be implemented by a DSLAM, or similar functioning switch which could perform the necessary routing and switching functions to provide connectivity to the requested communication devices 202, 204 or i. In this application, the DSLAM would be connected to the access switch 214 via a single permanent VC.

FIG. 4 also shows that an access provider operator working in access provider network 216 may establish connectivity to any communication device having a predefined VC residing in the address table of an alternative embodiment of troubleshooting portal 100. For example, the access provider operator could access communication device 202 from computer terminal 64 by establishing a session with troubleshooting portal 100, and by requesting troubleshooting portal 100 to have access unit 214 provide connectivity to communications device 202 using VC 218.

Figure 5:
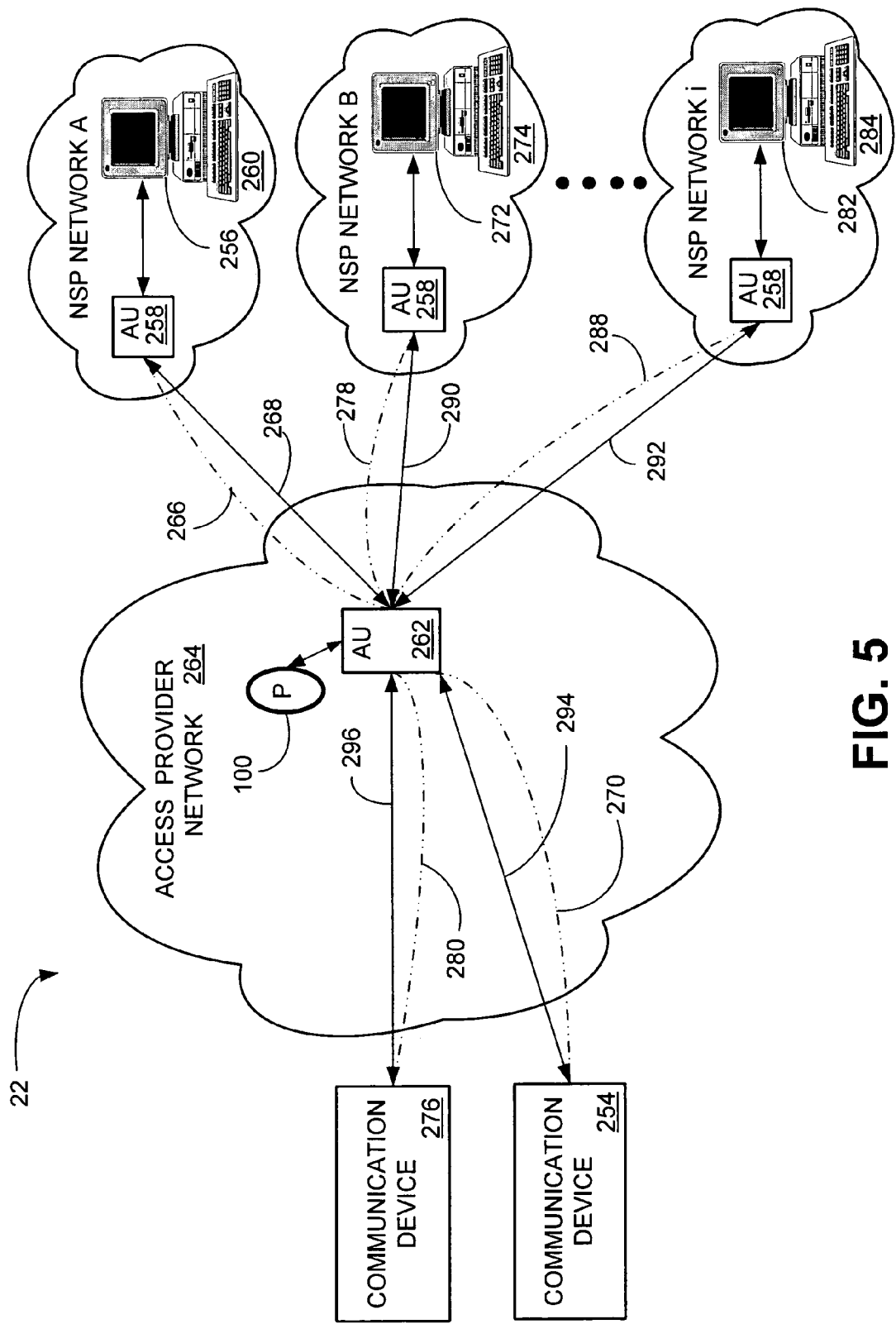
FIG. 5 is a block diagram illustrating a plurality of NSP networks connecting through an alternative embodiment of a troubleshooting portal.

FIG. 5 is a simplified illustrative example of an alternative embodiment of the troubleshooting portal 100 which provides access to a plurality of NSP networks. Troubleshooting portal 100 is shown as connected to and in communication with access unit 262. For example, an NSP operator working from NSP network A 260 may access communication device 254 from computer terminal 256 by establishing a session with troubleshooting portal 100. Connectivity between NSP network A 260 and access provider network 264 is shown by VC 266, which corresponds to the physical link 268. Once the NSP operator has established a session with troubleshooting portal 100, the operator specifies an identifier to the troubleshooting portal 100 which is associated with communication device 254. Then, one embodiment of troubleshooting portal 100 would instruct access unit 262 to couple VC 266 with the predefined VC 270 as specified in the address table residing in troubleshooting portal 100. An alternative embodiment of troubleshooting portal 100 would instruct access unit 262 to route management traffic over VC 266 and VC 270.

Similarly, an NSP operator working from computer terminal 272 residing in NSP network B 274, may establish connectivity with communication device 276 by establishing a session with troubleshooting portal 100 and then specifying an identifier associated with communication device 276. One embodiment of troubleshooting portal 100 has access unit 262 couple VC 278 with VC 280. An alternative embodiment of troubleshooting portal 100 would instruct access unit 262 to route management traffic over VC 278 and VC 280.

Likewise, an NSP operator working from computer terminal 282 residing in NSP network i 284, may establish connectivity with any communication device connected to access provider network 264 by establishing a session with troubleshooting portal 100 and by specifying an identifier associated with the desired communication device. Troubleshooting portal 100 would establish connectivity between the NSP operator and the desired communication device by either coupling VC 288 with the VC associated with the desired communication device, or would instruct access unit 262 to route management traffic over VC 288 and the VC associated with the desired communication device.

In these simplified illustrative examples, one skilled in the art will appreciate that VC 266 corresponds to physical link 268 which may have a plurality of switches and communication links (not shown). Likewise, VCs 270, 278, 280 and 288 correspond respectively to physical links 294, 290, 296 and 292. Physical links 294, 290, 296 and/or 292 may have a plurality of switches and communication links (not shown). This alternative embodiment of the troubleshooting portal 100 is seen to have the advantage of providing controlled access to a plurality of NSPs, where the plurality of NSPs are contracted with a plurality of customers to provide network services to a plurality of communication devices. That is, access provider network 264 may establish a troubleshooting portal 100 with an address table having connectivity information, such as, but not limited to, VCs, IP addresses, slot/port DSLAM or switch information. NSP operators will not have to continually bother and distract the access provider operators (not shown) each time one of the NSP operators needs to establish connectivity to a communication device connected to access provider network 264. Furthermore, such an alternative embodiment of a troubleshooting portal 100 having a security feature could limit the access of the various NSP operators to only those communication devices to which the NSP operators are authorized to access (e.g. only those communication devices for which an NSP operator has contracted to provide service to).

Figure 6:
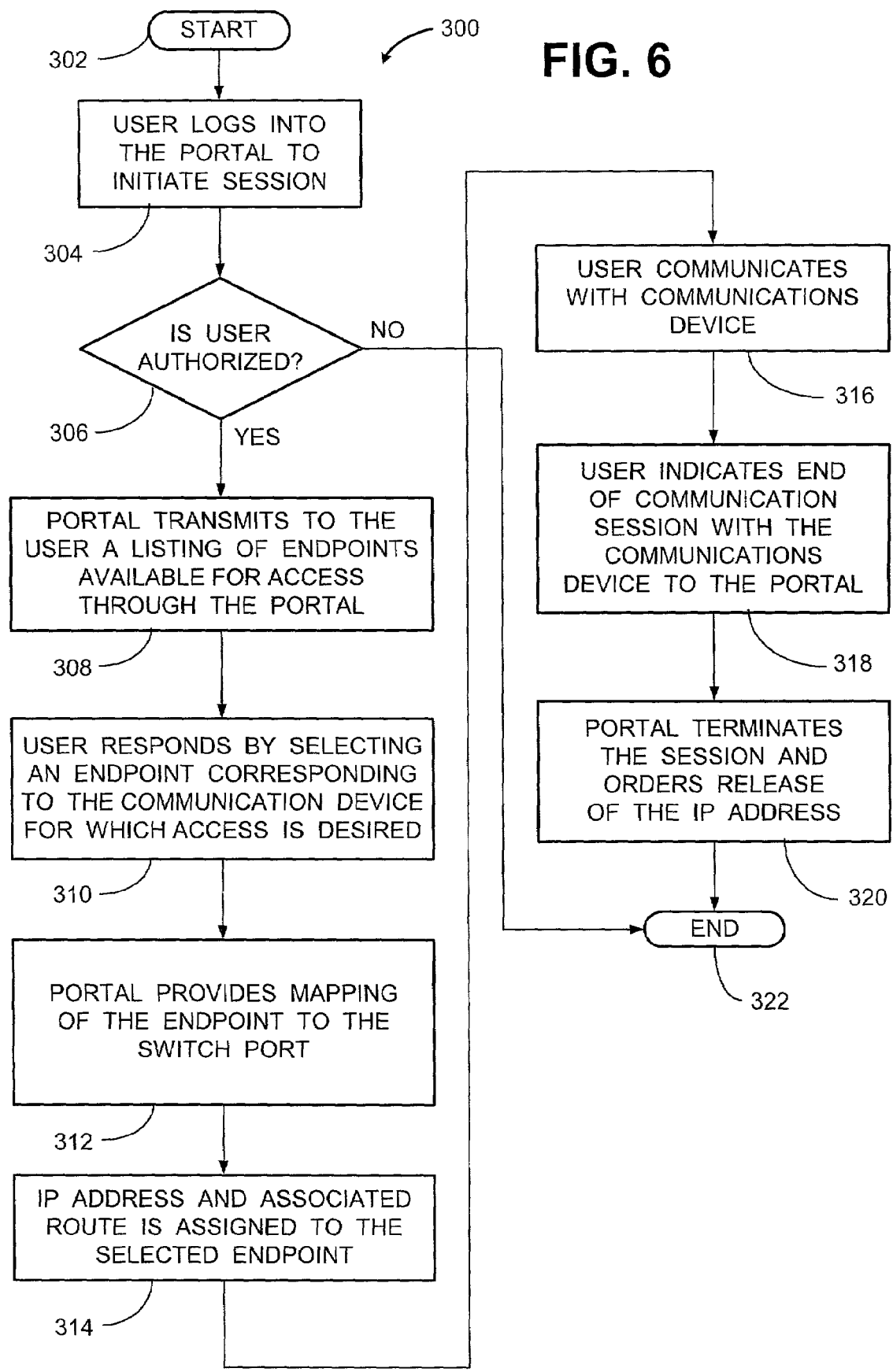
FIG. 6 is a flow diagram illustrating the operation of the preferred embodiment of the troubleshooting portal of FIG. 2.

FIG. 6 is a flow chart 300 illustrating the operation of logic for implementing one possible implementation of troubleshooting portal 100 of FIGS. 2, 4 and 5. The flow chart of FIG. 6 shows the architecture, functionality, and operation of a possible implementation of the software for implementing the logic for a troubleshooting portal 100. In this regard, each step may represent a module, segment, or portion of code, which comprises one or more executable instructions for implementing the specified logical function(s). It should also be noted that in some alternative implementations, the functions noted in the steps may occur out of the order noted in FIG. 6 or may include additional functions without departing significantly from the functionality of the troubleshooting portal 100. For example, two steps shown in succession in FIG. 6 may in fact be executed substantially concurrently, the steps may sometimes be executed in the reverse order, or some of the steps may not be executed in all instances, depending upon the functionality involved, as will be further clarified hereinbelow.

The process of using a troubleshooting portal 100 (FIGS. 2, 4 and 5) begins at step 302. In the preferred embodiment of troubleshooting portal 100, the NSP operator, hereinafter referred to as the user, logs into the portal to initiate a session with troubleshooting portal 100. In alternative embodiments, as previously described, the user may be an access provider operator or another individual requiring access to a communications device.

Step 306, in embodiments of a troubleshooting portal having a security feature as previously described, determines whether or not the user is authorized to log into the portal and initiate a session. If not, the NO condition, the process ends at step 322. If the user is authorized, the YES condition, the process continues to step 308. One possible implementation of troubleshooting portal 100 may include a feature where the portal transmits to the user a listing of circuit IDs or the like corresponding to end points available for access through the troubleshooting portal 100. As previously discussed, alternative embodiments of the troubleshooting portal 100 may provide other forms of identifying information by which the user may specify the desired communication device or may provide further opportunity for the user to provide the necessary certification under the NO condition of step 306.

At step 310, the user responds by specifying to the troubleshooting portal 100 an end point or an equivalent identifier corresponding to the communication device for which access is desired. At step 312, the troubleshooting portal provides mapping of the endpoint to the switch port to which the endpoint is connected. As previously described, alternative embodiments of a troubleshooting portal 100 having security features may verify that the user is authorized to have access to the requested end point or communication device (steps not shown). If the user does not have authorized access, then the session may terminate or further provide an opportunity for the user to provide the necessary certification.

At step 314, an IP address and the associated route is assigned to the selected end point. The IP address, in the preferred embodiment, could be a permanent IP address assigned from the IP addresses in either the access provider's domain or the NSP's domain, or assigned a temporary IP address from an IP address pool from the access providers assigned IP address domain. At step 316, the troubleshooting portal and switch have established the requested connectivity to the selected end point (the associated communication device). The session continues at 316 where the user communicates with the selected communication device.

At step 318, the user indicates to the troubleshooting portal that the communication session has come to an end. At step 320, the troubleshooting portal terminates a session. If a temporary IP address has been assigned by troubleshooting portal 100, troubleshooting portal 100 orders the release of the temporary IP address. If the troubleshooting portal 100 embodiment employs the apparatus and method of coupling VCs together, or if a DSLAM or switch having similar functionalities is employed, troubleshooting portal 100 would instruct such devices to release the IP address and/or the communication device. The process then ends at step 322 and the IP address is released.

In alternative embodiments of the troubleshooting portal 100 (FIGS. 2, 4 and 5), an additional step (not shown) may be executed after step 316 which provides for the monitoring of communication activities between the user and the selected device. If there is no activity for a predetermined time period, the portal may initiate an automatic termination of the session. This alternative embodiment provides an automatic method for terminating a session should the user forget to sign-off and log-out of the portal session.

FIG. 7 is a block diagram illustrating a preferred embodiment of troubleshooting portal 100. The embodiment of troubleshooting portal 100 illustrated in FIG. 7 contains interface circuitry 342, communication bus 344, a processor 346, a device configuration module 352, timing circuitry 358 and a memory 350. The memory 350 has at least an address table 354, a signed IP address location 356 and security functions 348. Timing circuitry 358 includes clock 360.

Interface circuitry 342 interfaces with a communication system, such as but not limited to, a local area network (LAN) or Ethernet network or wide area network (WAN). Sessions with troubleshooting portal 100 can be established over this communication system 344 by an NSP operator (not shown) and/or an access provider operator (not shown). Also, communication system 344 provides connectivity to the access unit (not shown) which establishes connectivity to the requested endpoints as previously described (see FIGS. 2, 4 and 6). One skilled in the art will realize that communication system 344, as illustrated in FIG. 7, is only one of a variety of ways in which troubleshooting portal 100, operators, and components of the communication network may be in communication with each other. Any variety of communication schemes could be employed without effecting the functionality of troubleshooting portal 100. For example, the troubleshooting portal 100 may host routing functionality normally provided by other communications devices within communication system 344. The utilization of such alternative communication schemes with a troubleshooting portal 100 is intended to be within the scope of this disclosure and the claims for a troubleshooting portal 100.

Processor 346 performs the various processing functions associated with the troubleshooting portal 100. For example, when a user initiates a session with troubleshooting portal 100 having the above-mentioned security functions, the user submits the required certification protocols and the security function logic is executed by processor 346 to validate the user's authority to access the portal and to access the requested end points. Security functions and protocol logic reside in the security functions 348 portion of memory 350. In an alternative embodiment, the processor 346 may be employed as part of another system and shared by the troubleshooting portal 100, or, the processor may be a dedicated element of troubleshooting portal 100. Additionally, the processor may reside in a convenient alternative location, such as, but not limited to, a stand alone facility without adversely affecting the functionality of the troubleshooting portal 100. Any such alternative embodiments of a troubleshooting portal 100 are intended to be within the scope of this disclosure and be protected by the accompanying claims for the troubleshooting portal 100.

Device configuration module 352 provides the necessary VC information to the access unit (not shown) based upon the address information residing in address table 354 of memory 350. Also, in the preferred embodiment of troubleshooting portal 100, the user specifies an IP address or equivalent identifier which is to be associated with the desired end point. The IP address is stored in the assigned IP address 356 portion of memory 350. Then, as device configuration module 350 maps the VCs and/or sets up the routes as required to establish connectivity between the user and the desired end point. Device configuration module 352 maps the assigned IP address with VCs and/or routes from the address table 354.

Alternative embodiments of the troubleshooting portal 100 may have timing circuit 358. Timing circuit 358 interfaces with processor 346 to monitor the activity of communications between the user and the endpoint. As long as communication activity is occurring between the user and the endpoint, the timing circuit 358 is inactive. However, when activity ceases between the user and the endpoint, a clock 360 associated with timing circuit 358 begins to clock such that timing circuit 358 can determine the period of inactivity between the user and the endpoint. If the detected inactivity continues for a pre-defined period of time, the timing circuit 358 instructs the processor 346 to terminate the session with the user.

Many variations and modifications may be made to components of the above-described embodiment of the troubleshooting portal 100 without departing substantially from the spirit and principles of the troubleshooting portal 100. For example, the above-described security features may be omitted. Any such alternative embodiments of a troubleshooting portal 100 are intended to be within the scope of this disclosure and be protected by the accompanying claims for the troubleshooting portal 100.

Alternative embodiments of the troubleshooting portal 100 (FIGS. 2, 4 and 5), may provide for a firewall configuration. Such a firewall configuration would perform the functions of filtering and providing security, as is well known in the art.

The preferred embodiment of troubleshooting portal 100 may employ a variety of methods to associate an IP address with an endpoint specified by the NSP operator or other party desiring to establish connectivity to the endpoint using the troubleshooting portal 100. One illustrative example described hereinabove was the use of an address table wherein a hierarchy is established such that the troubleshooting portal first checks to see if the endpoint has been associated with a permanent IP address assigned from the access provider's IP address domain. If not, then an IP address would be selected from an available pool of IP addresses from the access provider's IP address domain for the duration of the session. Embodiments of troubleshooting portal 100 working with a DSLAM, or similarly functioning switch, would identify the necessary VCs and/or routes to effect the necessary switching configuration through the DSLAM or switches such that the NSP operator or other user would have connectivity to the desired endpoint.

The preferred embodiment of troubleshooting portal 100 provides connectivity between the NSP operator or user and the specified end point, as identified by an IPS or equivalent identifier. Often, the IP address or an IP address associated with the equivalent identifier has been assigned to the end point by the NSP. Thus, there is no need to have a temporary IP address assigned or the need to employ an address translation method.

An alternative embodiment of a troubleshooting portal may be implemented utilizing network address translation (NAT) by the troubleshooting portal 100 (FIG. 2). With NAT, the NSP operators assigned IP address is translated (matched to) to the access provider's previously assigned IP address for the specified end point. Here, the troubleshooting portal 100 provides mapping of a circuit identifier and a selected end point into an IP address within the access provider network 24 (FIG. 2). The selection could be implemented via a circuit ID or an equivalent identifier, such as but not limited to, a system location and/or other means commonly employed in the art. The troubleshooting portal 100 would allow the NSP operator to select the device to address using a web page, telnet session or the like. The troubleshooting portal 100 would then provide a mapping and translation of the address used by the NSP operator to the device using the address within the network of the access provider. These access provider addresses could be private addresses which most access providers use within their networks.

Another alternative embodiment of a troubleshooting portal 100 (FIG. 2) may be implemented using IP proxy. This alternative would be particularly advantageous in environments where limited IP addresses are available. Here a single IP address is assigned to the switch 50. The switch 50 acts as a proxy agent for all end points connected to the switch 50. Although end points still have IP addresses, the switch 50 now allows the assignment of non-unique IP addresses to the end points. This proxy agent embodiment of a troubleshooting portal which utilizes repeatable IP addresses is known in the art as a globally unique locally scoped (GULS) addressable end point system.

It should be emphasized that the above-described embodiments of the troubleshooting portal, particularly, any "preferred" embodiments, are merely possible examples of implementations, merely set forth for a clear understanding of the principles of the troubleshooting portal. Many variations and modifications may be made to the above-described embodiment(s) of the troubleshooting portal without departing substantially from the spirit and principles of the troubleshooting portal. All such modifications and variations are intended to be included herein within the scope of this disclosure for the troubleshooting portal and be protected by the following claims.

At least the following is claimed:

1. A computer-implemented method, implemented in a troubleshooting portal device, for providing connectivity between a first communication device and a second communication device, the second communication device residing in an access provider communication network, the method comprising the steps of:

receiving a specification from the first communication device over a first communication channel, wherein the first communication device is located in a first network operated by a first provider, the specification comprising at least one predefined identifier of the second communication device;

receiving, from the first communication device, a request to establish connectivity between the first and the second communication device, wherein the second communication device is located in a second network operated by a second provider different than the first provider;

identifying a statically configured second communication channel to the second communication device that is associated with the predefined identifier;

configuring a network device to establish a route between the first communication device and the second communication device using the identified statically configured second communication channel;

receiving at least troubleshooting data and a test from the first communication device; and communicating the received troubleshooting data and the test to the second communication device.

2. The method of claim 1, wherein said step of establishing connectivity configuring further includes the step of configuring at least one switch such that a plurality of physical links associated with a plurality of data link connection identifiers (DCLIs) are coupled together.

3. The method of claim 2, wherein said step of configuring at least one switch configuring further includes the step of configuring a digital subscriber loop access multiplexer (DSLAM) connected to a plurality of second communication devices such that said second communication device associated with said specified identifier is connected by said step of establishing connectivity.

4. The method of claim 1, wherein said step of establishing connectivity configuring further includes the step of configuring the network device to route data over a plurality of physical links associated with said predefined identifier.

5. The method of claim 1, wherein said first communication device is located in a network service provider communication system.

6. The method of claim 1, wherein said first communication device is located in said access provider communication system.

7. The method of claim 1, wherein said step of associating further includes the step of associating a predefined circuit identifier (ID) with said second communication device.

8. The method of claim 1, further including the step of assigning a first internet protocol (IP) address, wherein said first IP address corresponds to said second communication device.

9. The method of claim 8, further including the step of associating a second IP address with said first IP address.

10. The method of claim 8, wherein the step of assigning the first IP address is performed by the access provider.

11. The method of claim 1, further including verifying a right to access and the steps of specifying and establishing are implemented only after the right to access is verified.

12. The method of claim 1, further including monitoring activity between said first communications device and said second communications device, and further including terminating connectivity after a predefined period of no activity.

13. The method of claim 1, wherein the predefined identifier is an IP address and the predefined communication channel is a VC.

14. The method of claim 1, wherein the first provider is a network service provider and the second provider is an access network provider.

15. The method of claim 14, wherein the method is performed by a device located in the second network operated by the access network provider.

16. The method of claim 1, wherein the configuring step further comprises the step of configuring a DSLAM to couple the first communication channel to the second communication channel.

17. The method of claim 1, wherein the predefined identifier is a circuit ID, and the circuit ID is associated with an IP address previously assigned to the second communication device.

18. The method of claim 1, wherein the predefined identifier is a circuit ID, further comprising the steps of:
at the network service provider, assigning a permanent IP address to the second communication device; and
associating the circuit ID with the assigned IP address.

19. The method of claim 1, wherein the predefined identifier is a circuit ID, further comprising the steps of:
at a network service provider, assigning a temporary IP address to the second communication device, the IP address selected from a pool of available addresses; and
associating the circuit ID with the assigned IP address.

20. The method of claim 1, further comprising the step of verifying the request before the configuring step.

21. The method of claim 1, further including the steps of:
monitoring activity between the first communications device and the second communications device; and
terminating connectivity between the first communications device and the second communications device after a predefined period of no activity.

22. The method of claim 1, wherein a portion of the access provider communication network is a frame relay network.

23. The method of claim 1, wherein a portion of the access provider communication network is an asynchronous transfer mode (ATM) network.

24. The method of claim 1, wherein a portion of the access provider communication network is an internet protocol (IP) network.

25. The method of claim 1, wherein a portion of the access provider communication network is a multiprotocol label switching (MPLS) network.

26. A computer-implemented method, implemented by a troubleshooting portal, for providing connectivity between a first communication device and a second communication device, the method comprising the steps of:
receiving a specification from the first communication device over a first communication channel, the specification comprising at least one predefined identifier of the second communication device;
receiving, from the first communication device, a request to establish connectivity between the first and the second communication device;
identifying a predefined second communication channel to the second communication device that is associated with the predefined identifier;
instructing a network device to couple the first communication channel to the second communication channel to establish connectivity between the first communication device and the second communication device using the predefined second communication channel, the first communication device located in a first network operated by a first provider, and the second communication device located in a second network operated by a second provider different than the first provider;
receiving at least troubleshooting data and a test from the first communication device; and
communicating the received troubleshooting data and the test to the second communication device.

27. The method of claim 26, wherein the first network is operated by a network service provider and the second network is operated by an access network provider.

28. The method of claim 27, wherein the method is performed by a device located in the second network operated by the access network provider.

29. The method of claim 26, wherein the step of associating further includes the step of associating a predefined circuit identifier (ID) with the second communication device.

30. The method of claim 26, further including the step of assigning a first internet protocol (IP) address, wherein the first IP address identifies the second communication device.

31. The method of claim 30, further including the step of associating a second IP address with the first IP address.

32. The method of claim 30, wherein the step of assigning the first IP address is performed by the network operated by the first provider.

33. The method of claim 26, further including the steps of:
monitoring activity between the first communications device and the second communications device
terminating connectivity between the first communications device and the second communications device after a predefined period of no activity.

34. The method of claim 26, further comprising the step of verifying the request before the configuring step.

35. The method of claim 26, wherein the predefined identifier is an IP address.

36. The method of claim 26, wherein the predefined communication channel is a VC.

37. The method of claim 26, wherein the coupling step further comprises the step of configuring a DSLAM to couple the first communication channel to the second communication channel.

38. The method of claim 37, wherein the predefined identifier is a circuit ID, and the circuit ID is associated with an IP address previously assigned to the second communication device.

39. The method of claim 37, wherein the predefined identifier is a circuit ID, further comprising the steps of:
at the network of the first provider, assigning a permanent IP address to the second communication device; and
associating the circuit ID with the assigned IP address.

40. The method of claim 26, wherein a portion of the second network is a frame relay network.

41. The method of claim 26, wherein a portion of the second network is an asynchronous transfer mode (ATM) network.

42. The method of claim 26, wherein a portion of the second network is an internet protocol (IP) network.

43. The method of claim 26, wherein a portion of the second network is a multiprotocol label switching (MPLS) network.

44. A computer-implemented method, implemented by a troubleshooting portal, for providing connectivity between a troubleshooting manager device and a managed communication device, the method comprising the steps of:
creating, upon user request, a statically configured predefined first channel between the managed communication device and an access unit within an access provider network;
receiving, over a second channel, an identifier of the managed communication device from the troubleshooting manager device;

receiving, from the troubleshooting manager device, a request to establish connectivity between the troubleshooting manager device and the identified managed communication device;

instructing a network device to couple the statically configured predefined channel to the second channel, producing a third channel;

receiving at least troubleshooting data and a test from the troubleshooting manager device; and communicating the received troubleshooting data and the test to the managed communication device over the third channel.

45. The method of claim 44, wherein the predefined identifier is an IP address and the predefined communication channel is a VC.

46. The method of claim 44, wherein the receiving the request step is performed in the access network provider network.

47. The method of claim 44, wherein the instructing step further comprises configuring a DSLAM to couple the first channel to the second channel.

48. The method of claim 44, wherein the predefined identifier is a circuit ID, and the circuit ID is associated with an IP address previously assigned to the managed communication device.

49. The method of claim 44, wherein the predefined identifier is a circuit ID, further comprising:

assigning, at the network service provider, a temporary IP address to the managed communication device, the IP address selected from a pool of available addresses; and associating the circuit ID with the assigned IP address.

50. The method of claim 44, further comprising verifying the request, wherein the configuring step is dependent on the successful operation of the verifying step.

51. A computer-readable medium having a program, implemented by a troubleshooting portal, for providing connectivity between a first communication device and a second communication device, the program comprising the steps of:

receiving a specification from the first communication device over a first communication channel, the specification comprising at least one predefined identifier of the second communication device, the first communication device located in a first network operated by a first provider and the second communication device located in a second network operated by a second provider different than the first provider;

receiving, from the first communication device, a request to establish connectivity between the first and the second communication device;

identifying a statically configured second communication channel to the second communication device that is associated with the predefined identifier;

coupling the first communication channel to the second communication channel to establish connectivity between the first communication device and the second communication device;

receiving at least troubleshooting data and a test from the first communication device; and communicating the received troubleshooting data and the test to the second communication device.

52. The computer-readable medium of claim 51, wherein the first network is operated by a network service provider.

53. The computer-readable medium of claim 51, wherein the second network is operated by an access network provider.

54. The computer-readable medium of claim 51, wherein a portion of the second network is a frame relay network.

55. The computer-readable medium of claim 51, wherein a portion of the second network is an asynchronous transfer mode (ATM) network.

56. The computer-readable medium of claim 51, wherein a portion of the second network is an internet protocol (IP) network.

57. The computer-readable medium of claim 51, wherein a portion of the second network is a multiprotocol label switching (MPLS) network.

* * * * *